(12) United States Patent
Dang

(10) Patent No.: US 8,491,199 B1
(45) Date of Patent: Jul. 23, 2013

(54) FIBER OPTIC CONTACTS AND CONNECTORS

(75) Inventor: Phong Dang, Auburn, WA (US)

(73) Assignee: Carlisle Interconnect Technologies, Inc., Kent, WA (US)

( * ) Notice: Subject to any disclaimer, the term of this patent is extended or adjusted under 35 U.S.C. 154(b) by 175 days.

(21) Appl. No.: 13/187,376

(22) Filed: Jul. 20, 2011

Related U.S. Application Data

(60) Provisional application No. 61/366,440, filed on Jul. 21, 2010.

(51) Int. Cl.
*G02B 6/38* (2006.01)

(52) U.S. Cl.
USPC ............................................. 385/87; 385/84

(58) Field of Classification Search
USPC ....................................... 385/84, 87
See application file for complete search history.

(56) References Cited

U.S. PATENT DOCUMENTS

| | | | |
|---|---|---|---|
| 4,140,366 A | | 2/1979 | Makuch et al. |
| 4,718,745 A | * | 1/1988 | Strait, Jr. .......................... 385/64 |
| 5,404,416 A | | 4/1995 | Iwano et al. |
| 5,446,817 A | | 8/1995 | Kardos et al. |
| 5,608,828 A | | 3/1997 | Coutts et al. |
| 6,206,579 B1 | | 3/2001 | Selfridge et al. |
| 6,870,996 B2 | | 3/2005 | Doss et al. |

\* cited by examiner

*Primary Examiner* — Omar Rojas
(74) *Attorney, Agent, or Firm* — Stoel Rives LLP

(57) ABSTRACT

A fiber optic socket contact includes a socket contact body and a capped sleeve containing a spring and a retention clip that engages a socket contact body. A fiber optic pin contact includes a pin contact body. One optical fiber is gripped by the socket contact body and another optical fiber is gripped by the pin contact body. When connector housings holding the fiber optic socket contact and the fiber optic pin contact are connected together, the fiber optic pin contact enters the capped sleeve which aligns the fiber optic pin contact with the fiber optic socket contact. The spring applies a force to keep the optical fibers pressed together. In preferred arrangements the fiber optic socket contact and the fiber optic pin contact have outer dimensions that substantially match outer dimensions specified for electrical socket and pin contacts.

19 Claims, 17 Drawing Sheets

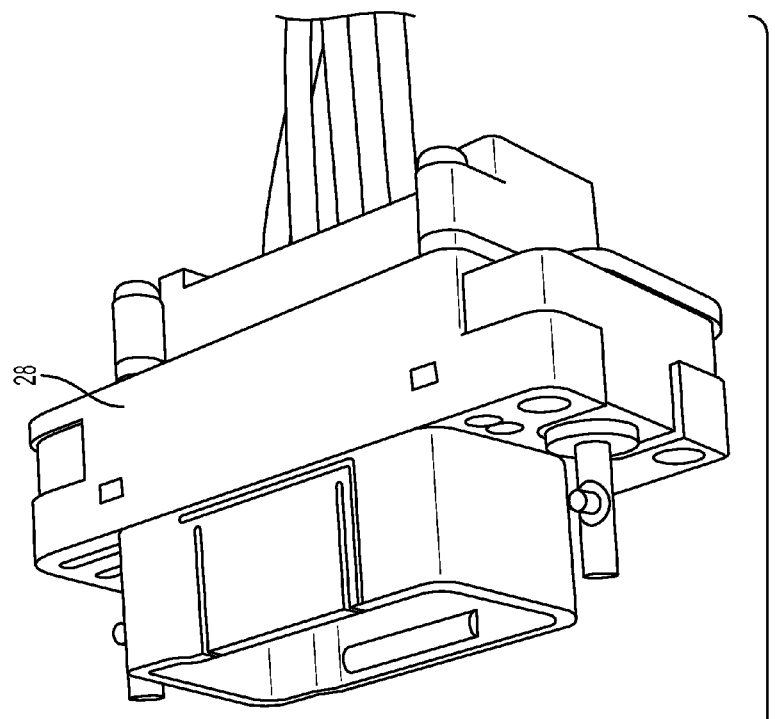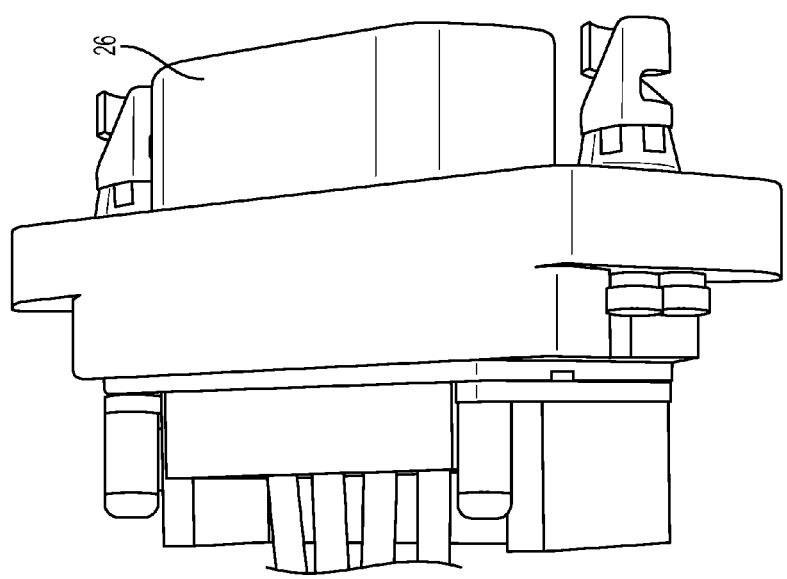
FIG. 2

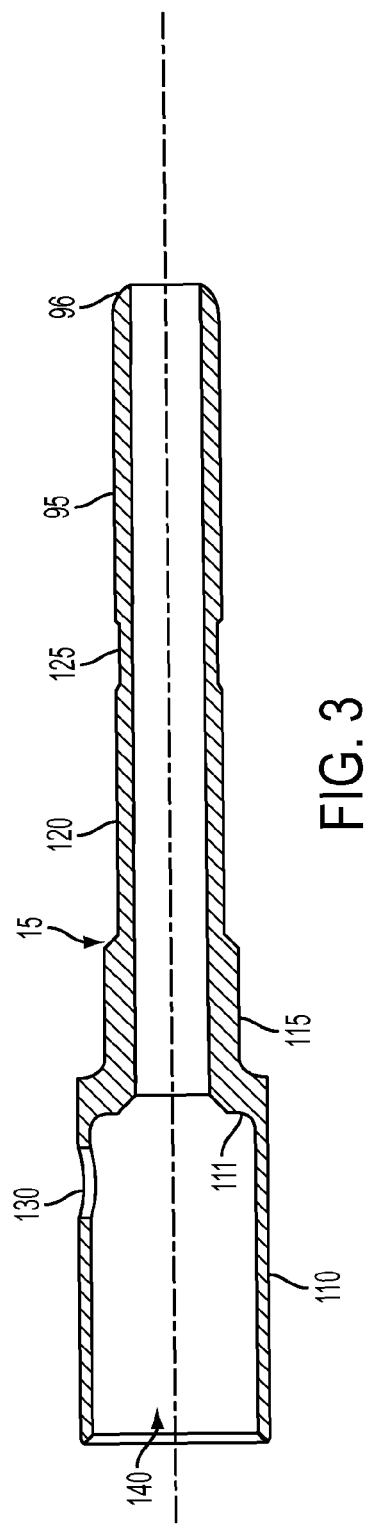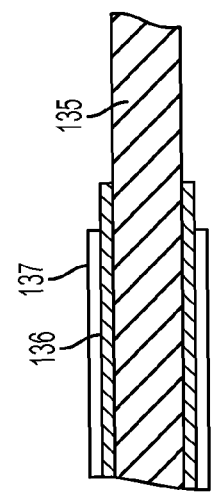

FIBER OPTIC CONTACTS AND CONNECTORS

RELATED APPLICATION

This application claims priority under 35 U.S.C. §119(e) to U.S. Patent Application No. 61/366,440 titled "Fiber Optic Contacts and Connectors" filed on Jul. 21, 2010 and fully incorporated herein by reference.

TECHNICAL FIELD

The present disclosure relates to socket and pin contacts for terminating optical fibers and to fiber optic connector assemblies including such contacts.

BACKGROUND

Electrical contacts, typically matched pairs of pin (plug) and socket contacts, are commonly used in connectors to connect together two electrically conductive wires or cables that transmit data or other information as electric signals. Because of increased data carrying capacity and decreasing costs, use of optical fibers, which transmit light, instead of carriers that transmit electric signals is becoming more commonplace. Like electric data carriers, optical fibers require terminating an end to connect an optical fiber to a piece of equipment or to another optical fiber.

The present inventor has recognized that, unlike electrical contacts, typical optical fiber contacts include springs to urge terminated ends of optical fibers together, for example, as described in U.S. Pat. Nos. 5,404,416 and 5,608,828, to ensure a reliable, optical connection between the terminated optical fiber ends. The present inventor has recognized several disadvantages associated with typical optical fiber contacts. One such disadvantage the present inventor has recognized is that typical optical fiber contact designs commonly exhibit a specialized design and different form factor compared against current electrical contacts. The present inventor has also recognized that typical optical fiber contacts have the disadvantage of commonly requiring an optical fiber to be secured in a contact using epoxy, glue, or other relatively time consuming manner that requires specialized training. The present inventor has also recognized that typical optical fiber contacts commonly include multiple components that are difficult and time consuming to assemble.

SUMMARY

The present inventor has recognized that there is an existing inventory of tools and connectors, (i.e., housings for electrical contacts) that are used with electrical pin and socket contacts. The present inventor has also recognized that many technicians are trained to use such existing tools to insert and extract electrical contacts from connectors. Further, the present inventor has recognized a need to use existing training, existing tools, and existing electrical connector bodies designed for use with electrical contacts, but using fiber optic contacts in place of the electrical contacts. The present inventor has also recognized a need for fiber optic contacts that are relatively easy to assemble and install in a connector body.

An embodiment preferably meets one or more of the above-identified needs, or other need, by including a fiber optic socket contact and a fiber optic pin contact, each terminating an optical fiber at a terminal end that are configured for use with existing electrical connectors and tools designed for electrical socket and pin contacts.

For example, a preferred fiber optic socket contact includes a socket contact body and a capped sleeve containing a spring and a retention clip, that, when assembled, has outer dimensions that substantially match the outer dimensions specified for an electrical socket contact, for example, as specified by Boeing part number BACC47FK(3)(4), or other suitable standard. In some embodiments, a fiber optic socket contact has outer dimensions that substantially match the outer dimensions specified by other electrical socket contact standards. In other embodiments, a fiber optic socket contact fits, or seats, within a cavity, space, or housing designed to accommodate and hold electrical socket contacts. Preferably, a fiber optic socket contact includes a gripping section configured to deform inwardly onto a portion of a fiber optic cable to grasp the fiber optic cable, for example, like an electrical socket contact is crimped onto an electrical wire.

A preferred fiber optic pin contact has outer dimensions that substantially match the outer dimensions specified for an electrical pin contact, for example, as specified by, Boeing part number BACC47FKJ(3)(4), or other suitable standard. In other embodiments, a fiber optic pin contact can have outer dimensions that substantially match the outer dimensions specified by other electrical pin contact standards. Preferably, a fiber optic pin contact includes a gripping section configured to deform inwardly onto a portion of a fiber optic cable to grasp the fiber optic cable, for example, like an electrical pin contact is crimped onto an electrical wire.

Other embodiments may use similar components for fiber optic socket contacts and fiber optic pin contacts without necessarily being configured or dimensioned to be used with tools and connectors designed for use with existing electrical socket and pin contacts.

Additional aspects and advantages will be apparent from the following detailed description of preferred embodiments, which proceeds with reference to the accompanying drawings.

BRIEF DESCRIPTION OF THE DRAWINGS

FIG. 2 illustrates a prior art connector designed for use with electrical contacts, but with fiber optic socket and pin contacts inserted.

FIG. 3 illustrates a sectional view of the socket contact body of FIG. 1.

FIG. 3A illustrates a sectional view of an optical fiber with a portion of a jacket stripped away.

DETAILED DESCRIPTION OF PREFERRED EMBODIMENTS

Throughout the specification the term "fiber" refers to a single, separate optical transmission element that includes a core and a cladding layer; the term "fiber buffer" refers to a layer of material surrounding a fiber and used to protect the fiber from physical damage by providing mechanical isolation or protection; the term "jacket" refers to an outer layer of material that surrounds and protects fibers and fiber buffers from the outside environment; and the term "fiber optic cable" refers to a package for a fiber or fibers that preferably includes one or more fibers, fiber buffers protecting the fiber or fibers, optionally, a strength member, and a jacket. Therefore, a fiber optic cable including a single fiber will terminate with a single fiber optic socket contact, such as fiber optic socket contact 5, or a single fiber optic pin contact, such as fiber optic pin contact 10. A fiber optic cable including more than one fiber will terminate in a number of fiber optic socket or pin contacts equal to the number of fibers.

Figure 2A:
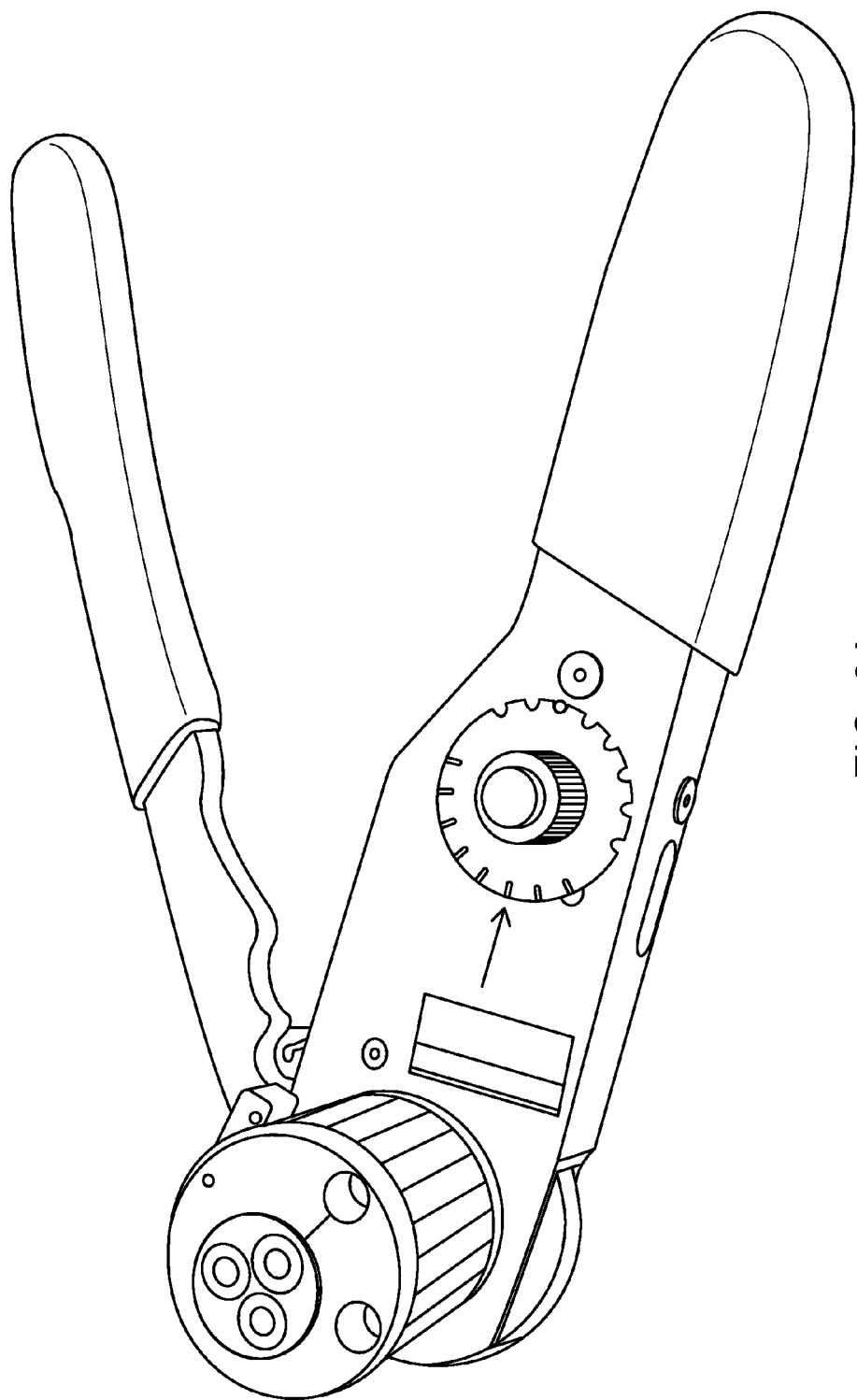
FIG. 2A illustrates a prior art crimping tool designed for use with electrical contacts.

Fiber optic socket and pin contacts are used to terminate the ends of fibers when a fiber optic cable is connected to a device that transmits or receives light pulses (optical device), or to another fiber optic cable. To connect a fiber optic cable to an optical device or to another fiber optic cable it is preferable to place fiber optic socket or pin contacts terminating such a fiber optic cable in a connector, i.e., a housing, to mechanically hold the fiber optic socket or pin contacts in a preferred arrangement. An exemplary connector 26 with fiber optic socket contacts 5 being inserted into the connector is illustrated in FIG. 2. Preferably, a mating connector 28 that houses fiber optic pin contacts 10 is used to connect the fiber optic cable terminating in connector 26 to the fiber optic cable terminating in connector 28. In some embodiments, either connector 26 or 28 may be connected to an optical device.

Figure 1:
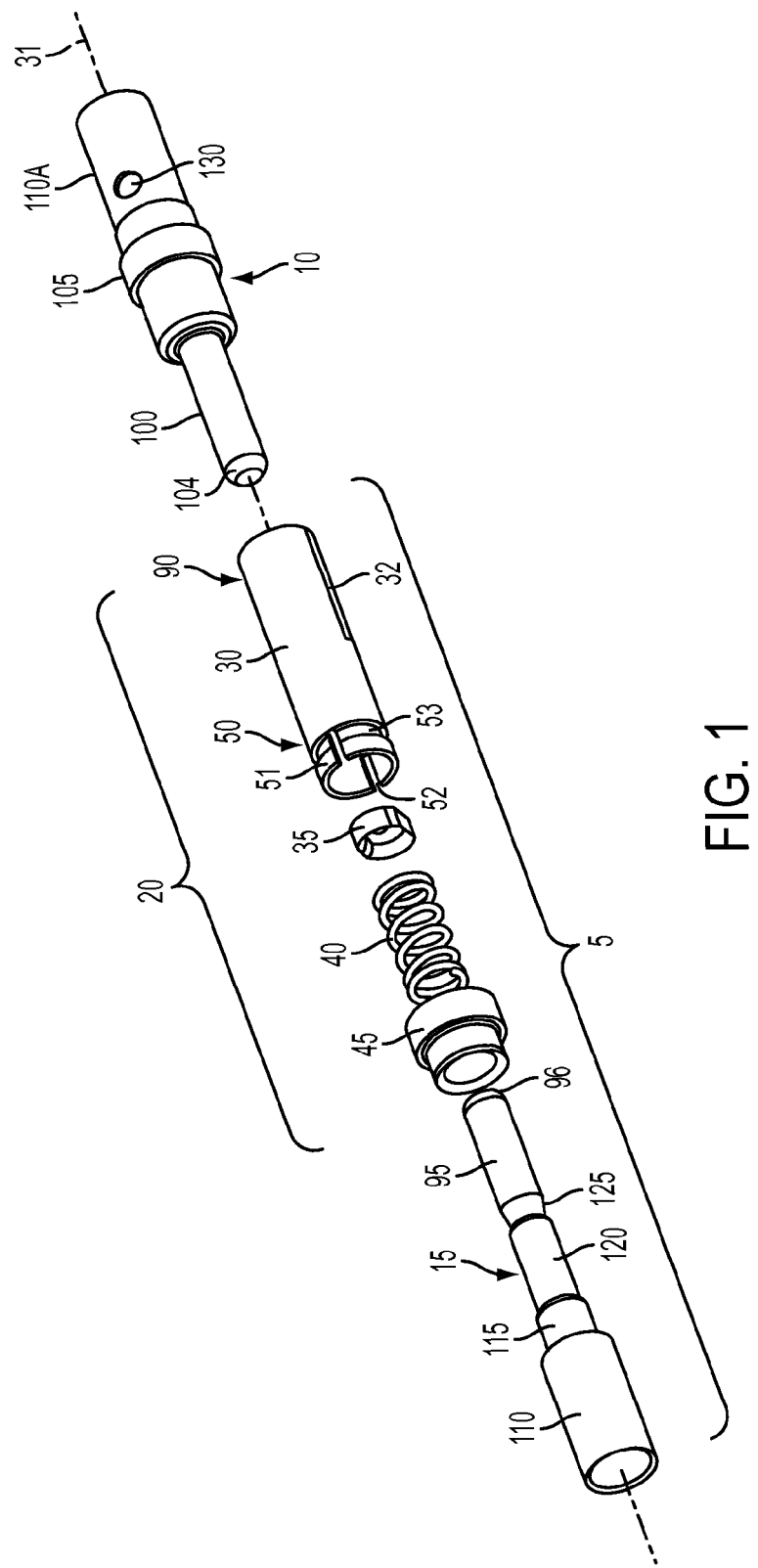
FIG. 1 illustrates an orthogonal assembly view of a fiber optic socket contact and fiber optic pin contact system.
Figure 1A:
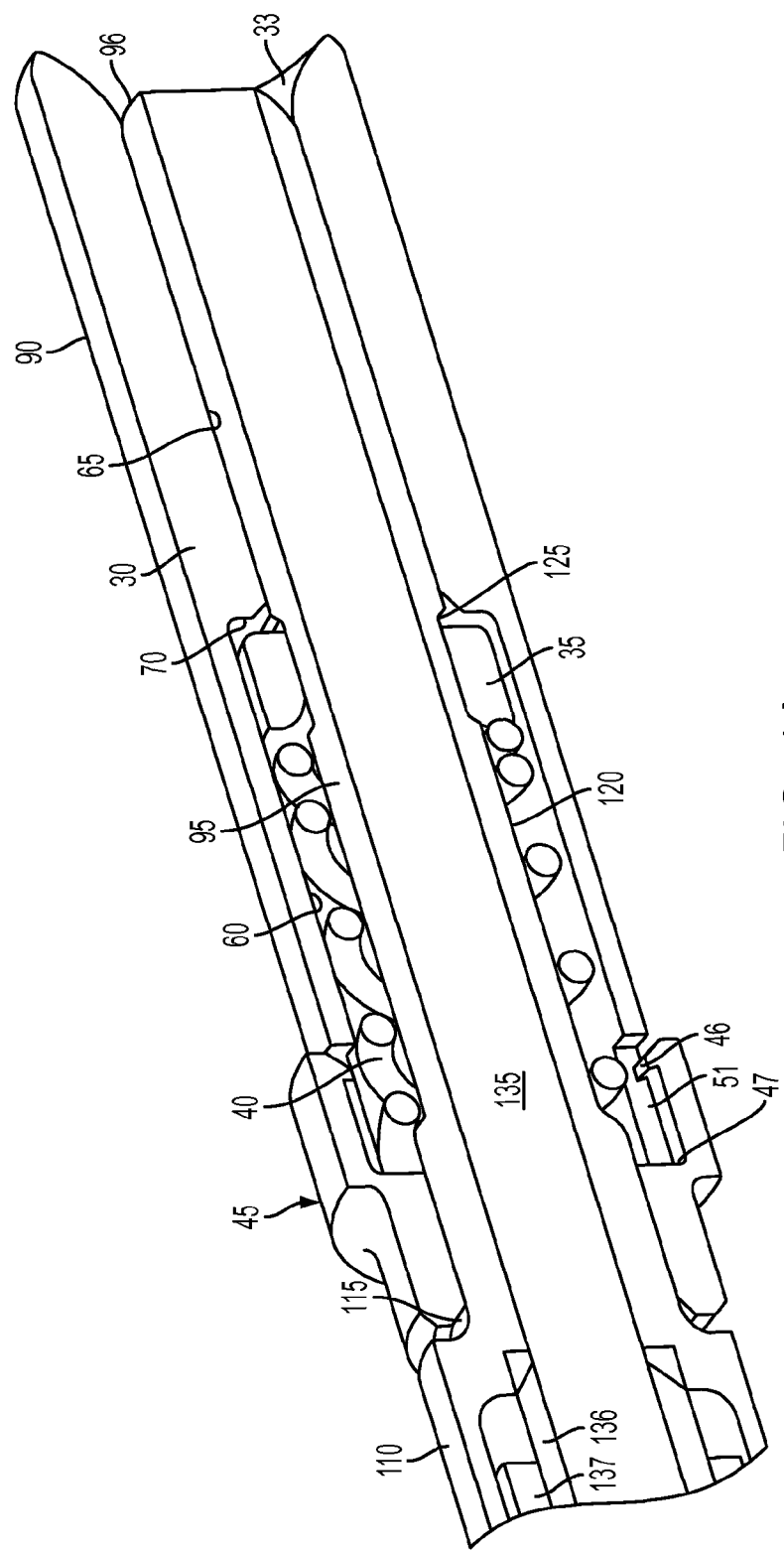
FIG. 1A illustrates an orthogonal sectional view of the fiber optic socket contact of FIG. 1.

A preferred fiber optic socket contact 5 and fiber optic pin contact 10 arrangement is illustrated in FIG. 1. The fiber optic socket contact 5 is preferably an assembly of a socket contact body 15 with an alignment sleeve assembly 20. Preferably, the socket contact body 15 and the alignment sleeve assembly 20, when assembled together to form fiber optic socket contact 5, are configured and dimensioned to fit into contact cavities (not illustrated) in connector 26 (FIG. 2). Connector 26 is preferably a standard connector configured to receive and hold electrical socket contacts, such as electrical socket contacts that meet at least one of the specifications designated by MIL-C-M39029/yy-xxx (where "yy" and "xxx" represent numeric digits used to designate various socket contact configurations and dimensions), for example, MIL-C-M39029/57-354, Boeing part number BACC47FK(#)(#) (where "#" represents an integer, for example, BACC47FK(3)(4)), or other suitable standard. Fiber optic pin contact 10 is also preferably configured and dimensioned to fit into contact cavities (not illustrated) in mating connector 28, which is preferably a plug connector body of the kind sized and configured to receive and hold electrical pin contacts. For example, connector 28 preferably is configured to receive and hold electrical pin contacts that meet at least one of the specifications designated by MIL-C-M39029/yy-xxx, for example, MIL-C-M39029/58-363, Boeing part number BACC47FKJ(#)(#), for example, BACC47FKJ(3)(4), or other suitable standard. In the following specification, reference will be made to MIL-C contacts for ease of reference, but any suitable electrical socket contact standard may be used.

Preferred embodiments are sized to engage connectors that accommodate electrical socket and pin contacts sized for 16 gage wire. Other embodiments may be sized to engage connectors that accommodate electrical socket and pin contacts sized for other size wires, such as, but not limited to, 14 gage, 12 gage, etc. When embodiments are sized to engage connectors that accommodate electrical socket and pin contacts sized for larger size wires, such embodiments may, for example, include overall outer dimensions that are enlarged to engage such connectors, or may include connector engagement features, such as external ribs or ridges on alignment sleeve 30, cap 45, or other suitable location.

Preferably, fiber optic socket contacts 5 and fiber optic pin contacts 10 are configured and dimensioned to be inserted and removed from contact cavities (not illustrated) using tools developed for inserting and removing electrical socket and pin contacts, for example, those that meet at least one of the specifications designated by BACC47FK(#)(#), BACC47FKJ(#)(#), MIL-C-M39029/yy-xxx, or other suitable specification. For example, the contact crimping, contact insertion, and contact extraction tools manufactured by Carlisle Interconnect Technologies and illustrated in FIGS. 2A and 2B may be used. In other embodiments, a fiber optic socket contact, such as fiber optic socket contact 5, and a fiber optic pin contact, such as fiber optic pin contact 10, may be configured or dimensioned to fit into contact cavities in a connector where the contact cavities are not configured or dimensioned to receive and hold standard electrical socket or pin contacts.

Figure 4:
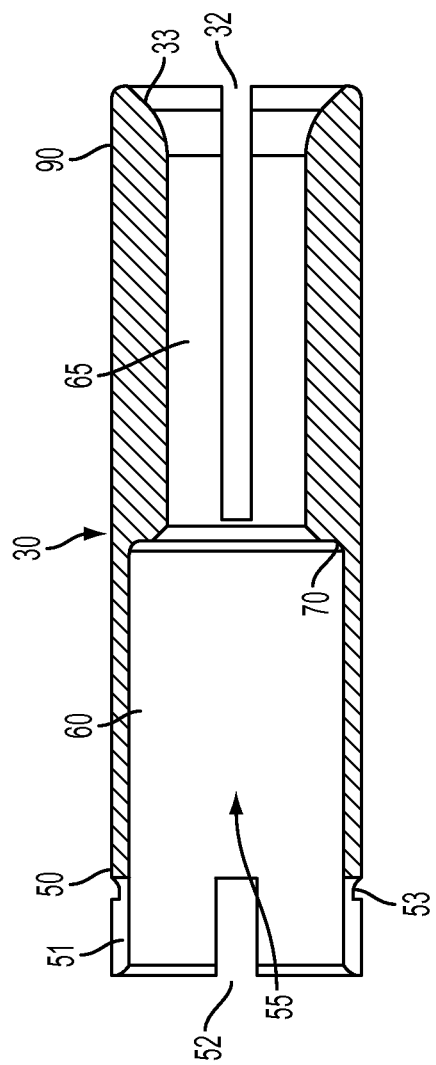
FIG. 4 illustrates a sectional view of the alignment sleeve of FIG. 1.
Figure 4A:
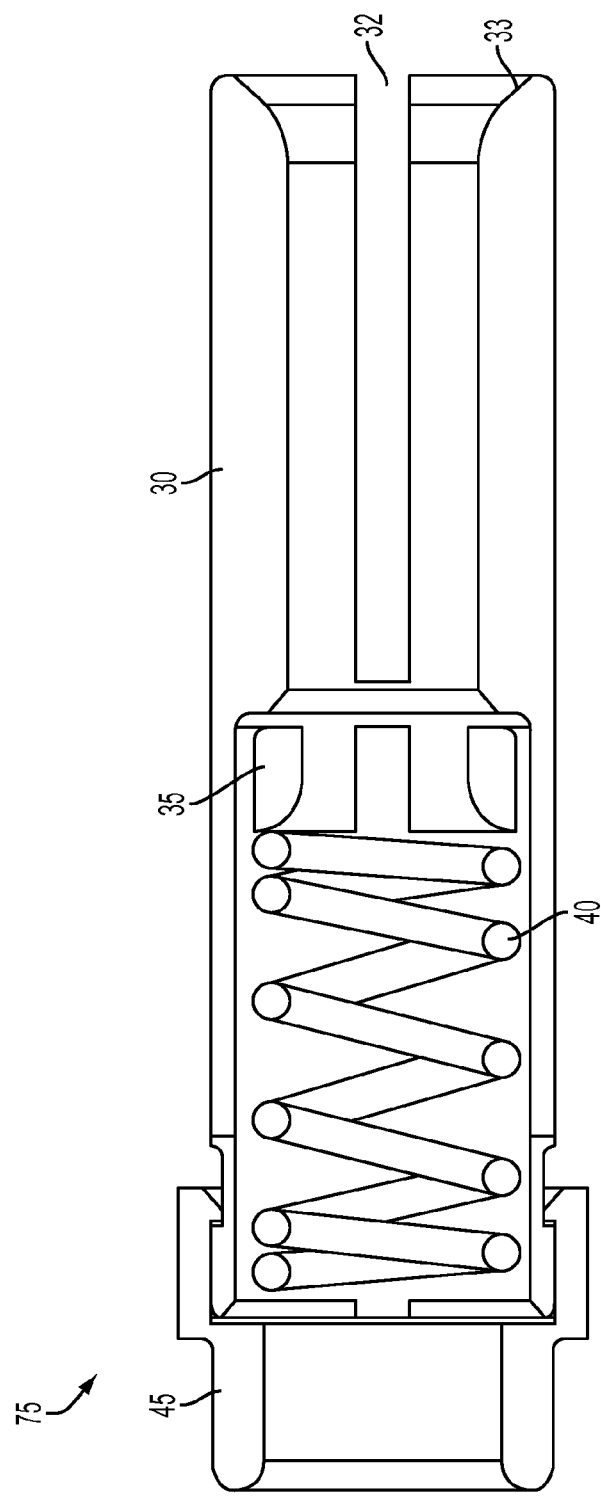
FIG. 4A illustrates a sectional view of a capped sleeve.
Figure 5:
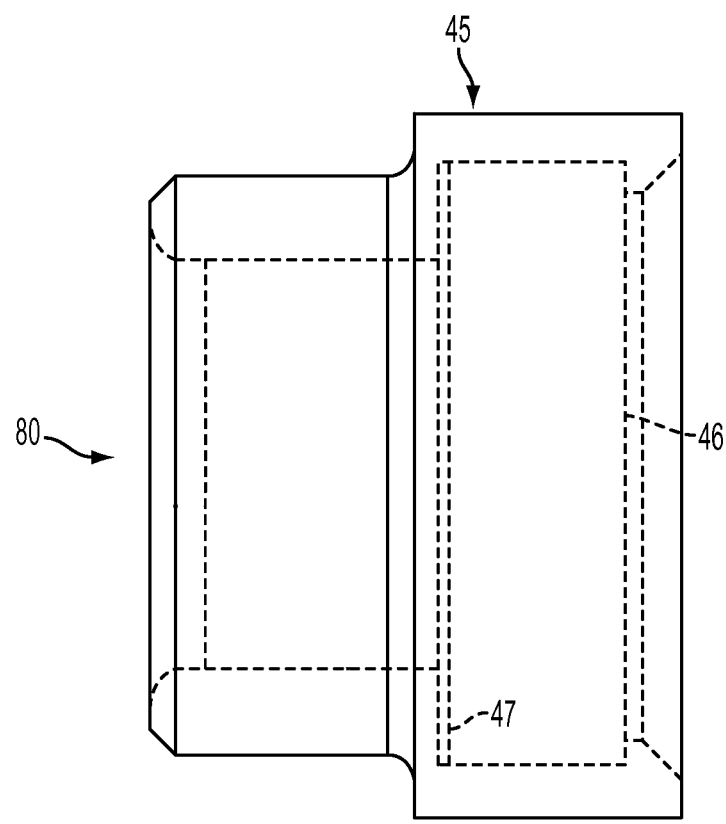
FIG. 5 illustrates a side view showing hidden lines for the cap of FIG. 1.

A preferred socket contact 5 is now described in further detail. The alignment sleeve assembly 20 preferably includes an alignment sleeve 30, a retention clip 35 contained in the alignment sleeve 30, a spring 40 also contained in the alignment sleeve 30, and a cap 45 affixed to a first end 50 of the alignment sleeve 30. As illustrated in FIG. 4, alignment sleeve 30 preferably includes an alignment bore 55 that has a larger diameter section 60 and a smaller diameter section 65. A shoulder 70 is preferably formed where the larger diameter section 60 and smaller diameter section 65 meet. Retention clip 35 preferably contacts shoulder 70 and contacts spring 40 when cap 45 is affixed to the alignment sleeve 30. Preferably, spring 40 is at least partially compressed when cap 45 is affixed to the first end 50 of alignment sleeve 30 to form a capped sleeve 75 (FIG. 4A). Cap 45 may be affixed in any suitable manner, including, but not limited to, a snap connection, a threaded engagement, a bayonet or other suitable quick connection configuration, a press fit, an interference fit, or epoxy, glue or other suitable adhesive.

FIGS. 1 and 4 illustrate a snap fit feature where the first end 50 of the alignment sleeve 30 includes a plurality of tabs 51 separated by slots 52. A groove 53 at the base of each tab 51 preferably facilitates each tab 51 flexing toward a central axis 31 of alignment sleeve 30 when cap 45 is affixed to alignment sleeve 30. A complimentary snap fit feature includes an annular ridge 46 (FIG. 10) in cap 45 that presses each tab 51 toward the central axis 31 when cap 45 is slid into place. Each groove 53 is preferably sized to receive annular ridge 46 and provide sufficient spring force for each tab 51 to flex back to, or substantially back to, its original position when cap 45 is in place on the first end 50 of the alignment sleeve 30. Preferably, when cap 45 is installed on first end 50, an audible click is heard when annular ridge 46 (a snap fit feature) enters grooves 53 (a complimentary snap fit feature) thus indicating that grooves 53 engage annular ridge 46 to hold cap 45 in place on the first end 50.

Capped sleeve 75 preferably includes a through bore made from a cap bore 80 extending through cap 45 and the alignment bore 55. As described below, the combination of cap 45, spring 40, and retention clip 35 urge socket contact body 15 towards second end 90 of alignment sleeve 30 when socket contact body 15 is inserted in capped sleeve 75. As also described below, the smaller diameter section 65 of alignment bore 55 aligns a terminal end 96 (such as a fiber optic terminal end configured to receive and expose a portion of a fiber optic) of socket contact body 15 with a terminal end 104 (such as a fiber optic terminal end configured to receive and expose a portion of a fiber optic) of pin contact body 105 when two connector portions terminating fiber optic cables are connected together and socket ferrule 95 and pin ferrule 100 are in the smaller diameter section 65 of alignment bore 55.

Referring to FIG. 3, a preferred socket contact body 15 includes a grip portion 110, a cap seat section 115, and a socket ferrule 95 that includes a spring engaging section 120 and a groove 125 (which is preferably a snap fit feature that engages a mating snap fit feature on retention clip 35). At least the grip portion 110 is preferably made of a malleable or plastically deformable material. Preferably, the grip portion 110, cap seat section 115, and socket ferrule 95 are a unitary construction formed from a single piece of material. For example, socket contact body 15 may be made by machining a single piece of steel, aluminum, plastic, or other suitable material to the appropriate shape and dimensions, or may be cast, drawn, molded, or otherwise suitably constructed. Preferably, groove 125 does not penetrate through a wall of socket ferrule 95 at any location of groove 125. A visual inspection aperture 130 may also be included through a wall of the grip portion 110. The function of the various features of the preferred socket contact body 15 are described below with respect to assembling fiber optic socket contact 5.

Figure 9:
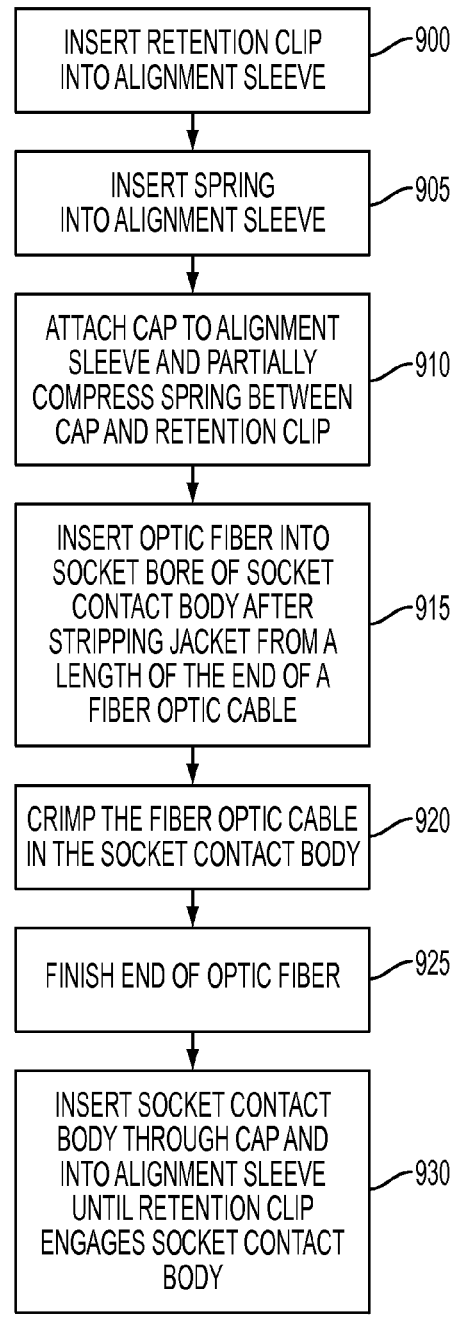
FIG. 9 illustrates a flow chart for a method for assembling a fiber optic socket contact.

A flowchart for a method for assembling a fiber optic socket contact 5 is illustrated in FIG. 9. At step 900 retention clip 35 is slid into the larger diameter section 60 of alignment bore 55, preferably until the retention clip 35 rests against shoulder 70. Spring 40 is slid into the larger diameter section 60 of alignment bore 55 at step 905, preferably until spring 40 touches retention clip 35. At step 910, cap 45 is attached to the first end 50 of alignment sleeve 30. Preferably, cap 45 is slid over tabs 51, thus flexing tabs 51, until annular ridge 46 engages grooves 53 formed at the base of tabs 51 and tabs 51 return, or substantially return, to their original position to provide a snap fit between cap 45 and alignment sleeve 30. The locating and locking features for a snap fit between cap 45 and alignment sleeve 30 may be otherwise suitably configured or located on cap 45 or alignment sleeve 30.

When cap 45 is affixed to alignment sleeve 30 at step 910 to form capped sleeve 75, spring 40 is preferably compressed, at least partially, so that spring 40 holds the retention clip 35 against shoulder 70. For example, spring 40 preferably contacts a shoulder 47 in cap bore 80 and contacts retention clip 35, and is compressed when shoulder 47 is moved toward retention clip 35 when cap 45 is attached to alignment sleeve 30. Spring 40 is preferably a linear coil spring, made from a stiff wire such as piano wire or other suitable wire, and preferably includes a spring constant of approximately 16 pounds per inch to approximately 25 pounds per inch. A preferred force for compressing spring 40 is approximately 1.6 pound-force to approximately 2.5 pound-force to compress spring 40 approximately 0.10 of an inch. Preferably, spring 40, when fully compressed, or nearly fully compressed, exerts sufficient force to overcome frictional, or other, forces between a fiber optic cable (FIG. 3A) and a connector component, such as a strain relief (not illustrated), to move socket contact body 15 toward the second end 90 of alignment sleeve 30 and hold the retention clip 35 against shoulder 70 as described below.

At step 915, a fiber optic cable including a single fiber 135 (FIG. 3A) is inserted into socket bore 140, which extends through socket contact body 15. Preferably, socket bore 140 is approximately 0.002 to approximately 0.005 of an inch larger than the outer diameter of fiber 135 (which typically includes a core material surrounded by a cladding layer). A jacket 137 and fiber buffer 136 are removed, or stripped, from an end portion of fiber 135, and fiber 135 is passed through the socket bore 140. Preferably a small portion of the fiber buffer 136 is exposed as illustrated in FIG. 3A to assist wedging fiber 135 in place in socket bore 140, for example, via frictional engagement with radius 111 (FIG. 3). A visual inspection aperture 130 preferably allows the assembler to visually confirm that a section of fiber 135 surrounded by jacket 137 is located in the grip portion 110 of the socket contact body 15. Placing a section of fiber 135 surrounded by fiber buffer 136 and jacket 137 in the grip portion 110 preferably permits use of a standard electrical contact crimping tool to collapse portions of the walls of crimp portion 110 onto the fiber optic cable without altering, or significantly altering, the light propagation characteristics of fiber 135. Other suitable manners for inwardly deforming the malleable or plastically deformable material of the grip portion 110 onto the jacket 137 or fiber buffer 136, such as swaging, for example, may be used. In some embodiments, for example, when a fiber optic cable includes multiple fibers, a jacketed portion of such a fiber optic cable may not be inserted into the grip portion 110, but a portion including a fiber buffer and fiber may be inserted into the grip portion 110.

At step 920, a crimping tool, for example a crimping tool used with standard 16 gauge electrical socket contacts such as those meeting at least one of the specifications designated as BACC47FK(#)(#), is used to crimp the grip portion 110 about the jacketed section of optical fiber 135 lying in the grip portion 110. For example, socket contact body 15 is preferably made from 304 stainless steel and the wall thickness of grip portion 110 is preferably approximately 0.006 of an inch and the inner diameter is preferably approximately 0.093 of an inch. A preferred outer diameter for the jacket 137 is approximately 0.105 of an inch, and a standard crimping tool preferably crushes portions of the wall forming grip portion 110 by approximately 0.010 to approximately 0.020 of an inch, preferably to form four indentations. Thus, crimping the socket contact body 15 onto the optical fiber 135 for one embodiment preferably secures optical fiber 135 in socket contact body 15 without using an adhesive and without interfering, or substantially interfering, with light signal propagation through the fiber 135.

At step 925, an end of fiber 135 protruding out of socket bore 140 past the terminal end 96 of socket ferrule 95 is trimmed, polished, or otherwise finished as is known in the art. Preferably, fiber 135 protrudes slightly past the terminal end 96, which contains a suitable opening for exposing a portion of the fiber 135, of socket ferrule 95 when finished. Socket contact body 15 is inserted in capped sleeve 75 at step 930 by pushing socket ferrule 95 through the cap bore 80, the larger diameter portion 60 of alignment bore 55 and spring 40, and into the smaller diameter portion 65 of alignment bore 55 until retention clip 35 engages socket ferrule 95, for example, by snapping into groove 125. Preferably, when socket ferrule 95 is installed in capped sleeve 75, a portion of the inside surface of the retention clip 35 acts as a snap fit feature to engage the socket ferrule 95 in a manner that transfers the force from spring 40 to the socket contact body 15 and also limits the movement of socket contact body 15 toward the second end 90 of alignment sleeve 30.

Figure 6:
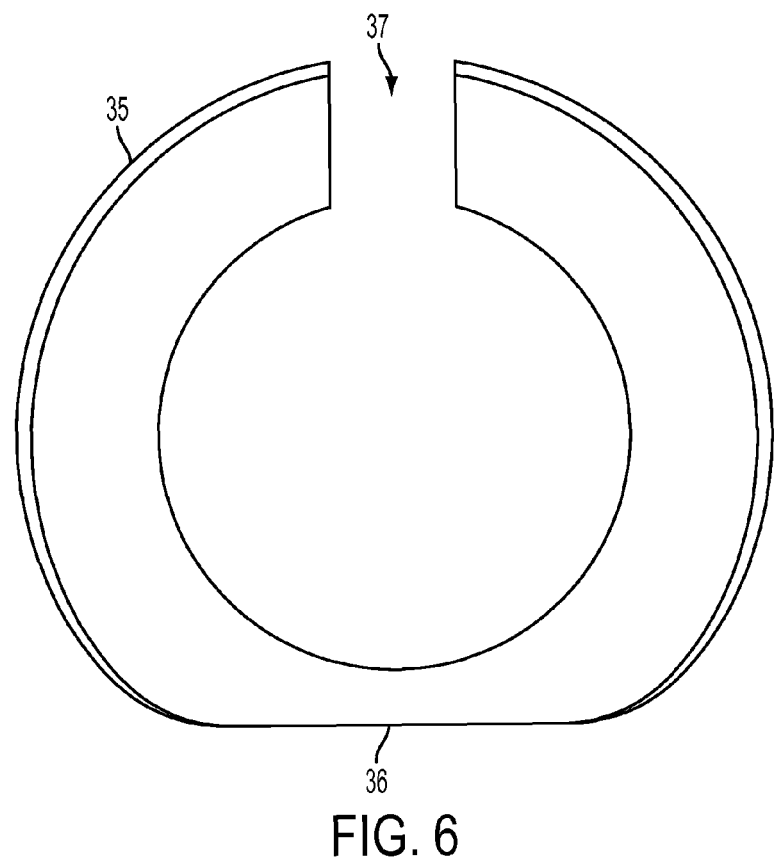
FIG. 6 illustrates a front side view of the retaining clip of FIG. 1.
Figure 7:
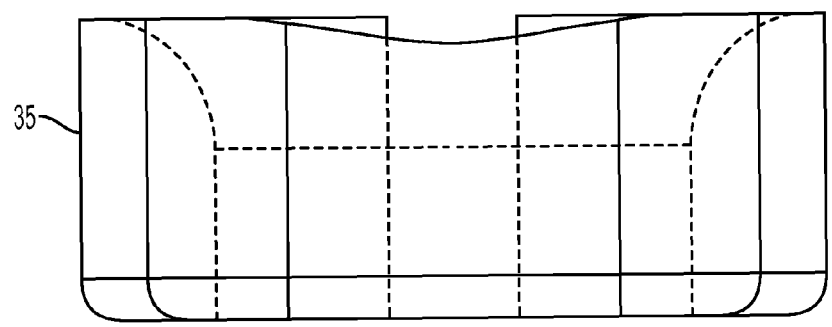
FIG. 7 illustrates a side view of the retaining clip of FIG. 1.
Figure 8:
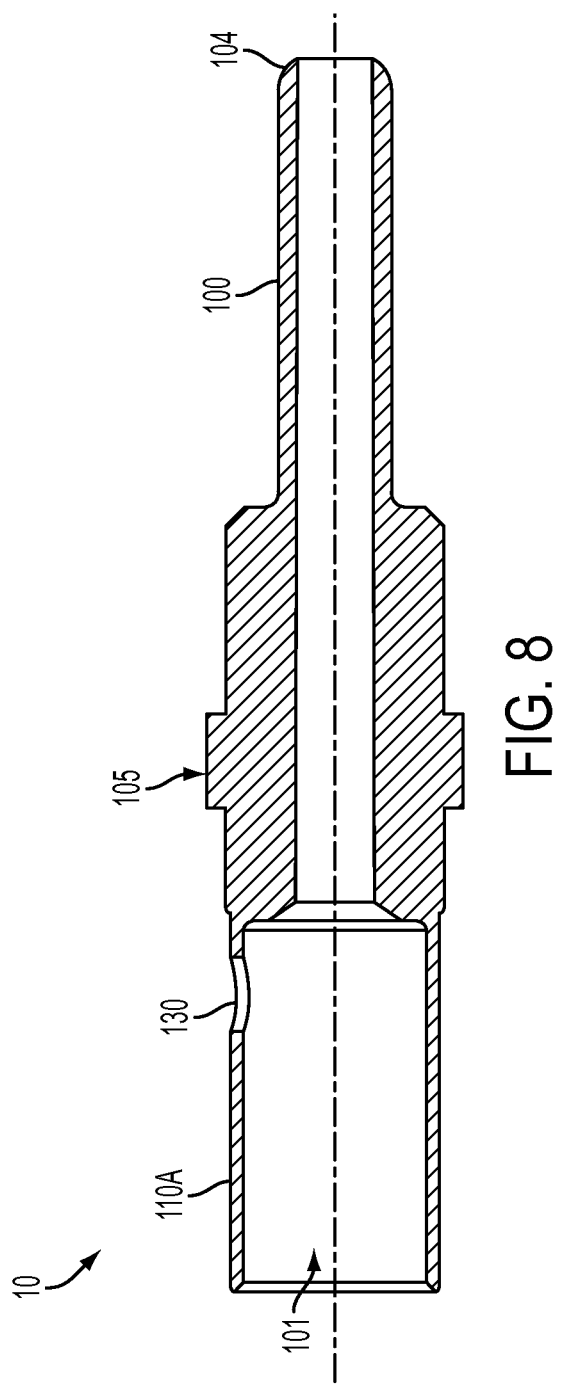
FIG. 8 illustrates a sectional view of the pin contact body of FIG. 1.

For example, as socket contact body 15 passes through the alignment bore 55 and ferrule 95 passes through retention clip 35, groove 125 engages retention clip 35, which is held in place by shoulder 70 and the force of spring 40. Groove 125 and retention clip 35 are preferably configured and dimensioned to create a snap fit between retention clip 35 and socket ferrule 95. In an exemplary embodiment, retention clip 35 is generally ring-shaped, with a flat 36 (FIG. 6) formed on one side of the ring-shape and a slot 37 formed through the wall of the ring-shape opposite the flat 36. The flat 36 and slot 37 are preferably configurable to adjust the amount of force with which retention clip 35 snaps into groove 125. Retention clip 35 is preferably configured to engage socket ferrule 95 by applying approximately 3 to approximately 4 pounds-force to groove 125. Preferably, engagement between retention clip 35 and groove 125 holds retention clip 35 in place on socket ferrule 95 to prevent socket contact body 15 from moving further toward the second end 90 of alignment sleeve 30 when retention clip 35 contacts shoulder 70. Engagement between retention clip 35 and groove 125 also preferably transfers force from spring 40 to socket contact body 15 to urge socket contact body 15 toward the second end 90 of alignment sleeve 30. Thus, when socket contact body 15 is pushed away from the second end 90 of alignment sleeve 30, spring 40 urges socket contact body 15 toward the second end 90 to either return retention clip 35 into contact with shoulder 70, or to press an end of optical fiber 135 crimped into socket contact body 15 against an end of a second optical fiber 135 crimped into pin contact body 10, as described below.

Alternatively, a retention clip, such as retention clip 35, may engage socket ferrule 95 in other suitable manners. For example, a retention clip may include an annular groove that engages an annular ridge on socket ferrule 95, a retention clip may be threaded onto socket ferrule 95, or before constructing a capped sleeve, such as capped sleeve 75, a cap 45 and spring 40 may be placed over socket ferrule 95 before adhering or welding a retention clip in place on socket ferrule 95.

Figure 2B:
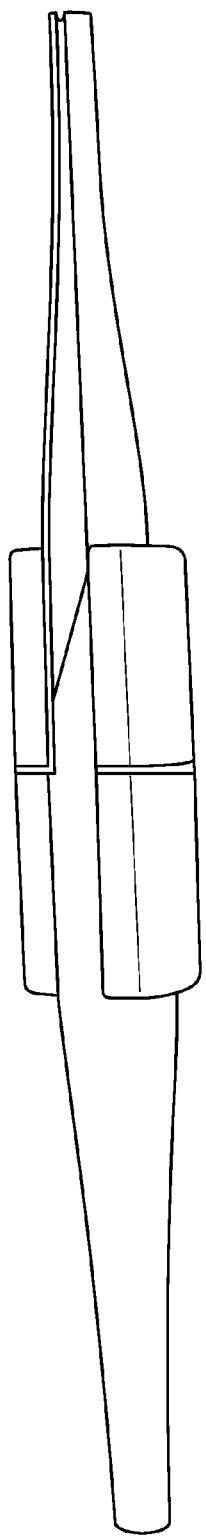
FIG. 2B illustrates a prior art contact insertion and extraction tool designed for use with electrical contacts.

An assembled fiber optic socket contact 5 containing an optical fiber 135 is preferably inserted into a connector housing standard tools for inserting electric socket contacts, such as tools used to insert 16 gauge electric sockets meeting one or more standards designated under a BACC47FK(#)(#) specification (FIG. 2B). A second optical fiber 135 is inserted and crimped into a fiber optic pin contact body 105, for example, with a grip section 110A substantially as described above with respect to socket contact body 15. A fiber optic pin contact 10 is preferably inserted into a second connector housing standard tools for inserting electric pin contacts, such as tools used to insert 16 gauge electric pins meeting one or more standards designated under a BACC47FKJ(#)(#) specification (FIG. 2B).

Figure 10:
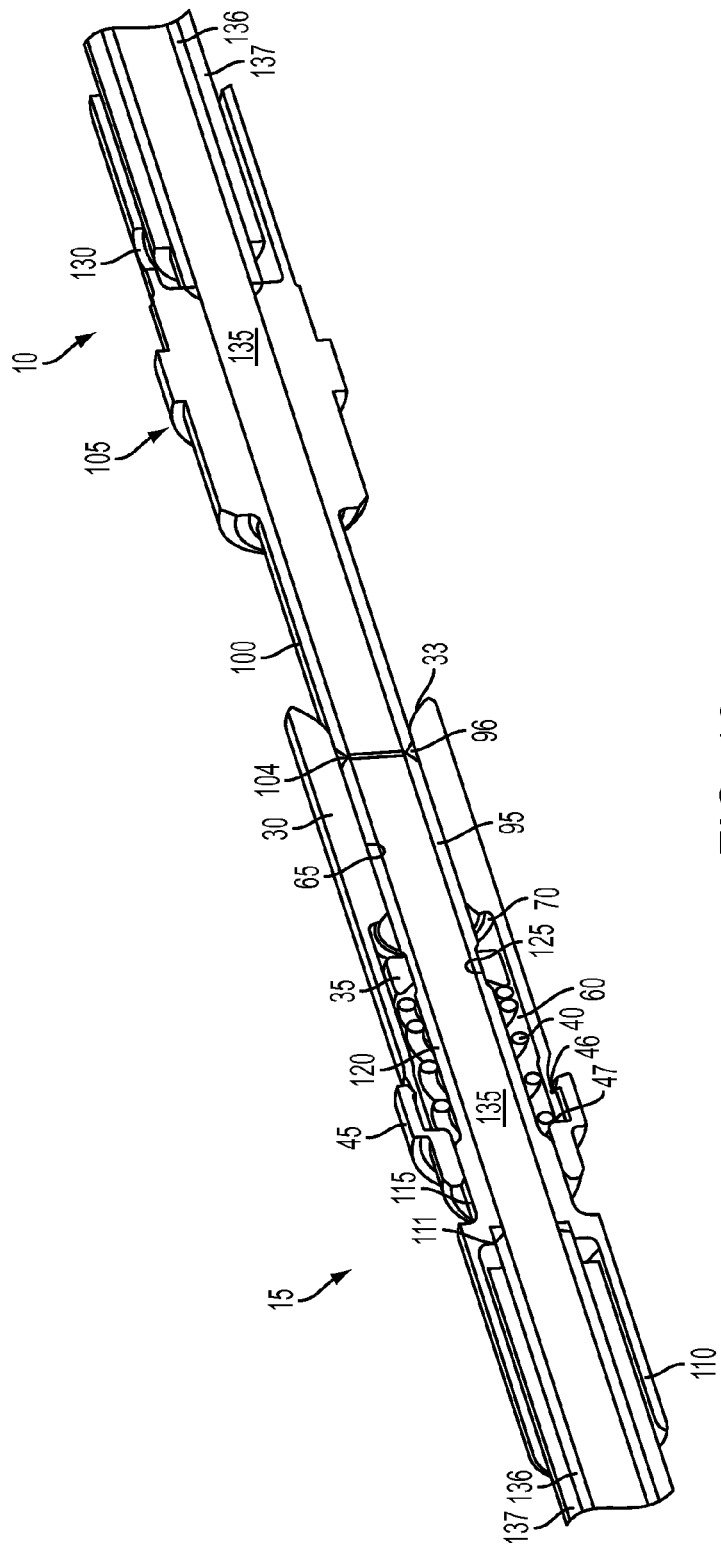
FIG. 10 illustrates an orthogonal sectional view of a fiber optic socket contact mated with a fiber optic pin contact.

With reference to FIG. 10, when the first and second connector housings are brought together, a pin ferrule 100 of fiber optic pin contact 10 enters the smaller diameter portion 65 of alignment bore 55. For clarity, connectors 26, 28 are not illustrated in FIG. 10, but socket contact 5 and pin contact 10 would typically be retained in connectors, such as connectors 26, 28, when joined together. Preferably, a radiused entrance 33 helps guide pin ferrule 100 into alignment bore 55. Alignment bore 55 is preferably dimensioned to receive both socket ferrule 95 and pin ferrule 100 with a press fit and to align them so that the terminal ends of the fibers 135 held by the socket contact body 15 terminal end 96 and the pin contact body 105 terminal end 104 are pressed together. Preferably, when the two connector housings are brought together, pin ferrule 100 enters far enough into the smaller diameter portion 65 of alignment bore 55 to push socket contact body 15 away from the second end 90 of the alignment sleeve 30 as illustrated in FIG. 10. Spring 40, acting though the engagement of retention clip 35 to socket ferrule 95, urges the socket contact body 15 toward the second end 90 of the alignment sleeve 30 to apply sufficient pressure to keep the finished, terminal ends of the optical fibers 135 held by the socket contact body 15 and the pin contact body 105 pressed together, regardless of vibrations or other conditions encountered during use of the connector. The amount of displacement of spring 40 and the force exerted by spring 40 when pin ferrule 100 enters alignment bore 55 are design parameters that can be modified depending on the expected operational environment for a connector to provide sufficient force to keep the finished ends of the fibers 135 held by the socket contact body 15 and the pin contact body 105 pressed together.

Preferably, alignment sleeve 30 includes one or more slots 32 (FIG. 4) through a sidewall of alignment sleeve 30 and proximate the second end 90. Slots 32 preferably allow alignment sleeve 30 to expand (and thus provide a spring force via such expansion which preferably elastically deforms a portion of the second end 90) when pin ferrule 100 is inserted into alignment bore 55. Slots 32 also preferably provide a spring force that urges portions of the second end 90 together when a pin ferrule 100 is inserted to apply a compression force to pin ferrule 100 to help hold pin ferrule 100 in place in alignment bore 55. In a preferred embodiment, two slots 32 approximately 0.015 of an inch wide and approximately 0.200 of an inch long are provided. Each slot 32 preferably extends along alignment sleeve 30 for approximately the distance of the smaller diameter portion 65 of the alignment bore 55. Preferably slots 32 facilitate creating a press fit between the alignment sleeve 30 and the pin ferrule portion 100.

Optionally, socket contact body 15 includes a cap seat section 115 that remains in constant contact with the inner wall of cap bore 80 throughout the compression range of spring 40. Preferably no part of socket contact body 15 becomes caught on cap 45 in a manner that prevents retention clip 35 from returning to contact shoulder 70 even if socket contact body 15 is moved away from the second end 90 of alignment sleeve 30 to the full extent of movement permitted by spring 40.

In a preferred embodiment, socket contact body 15, cap 45, retention clip 35, alignment sleeve 30, and pin contact body 105 are machined from 304 stainless steel. Other suitable materials may be used, such as T6-7075 aluminum alloy or other suitable metal, polytetrafluoroethylene, nylon, or other suitable polymer.

Figure 11:
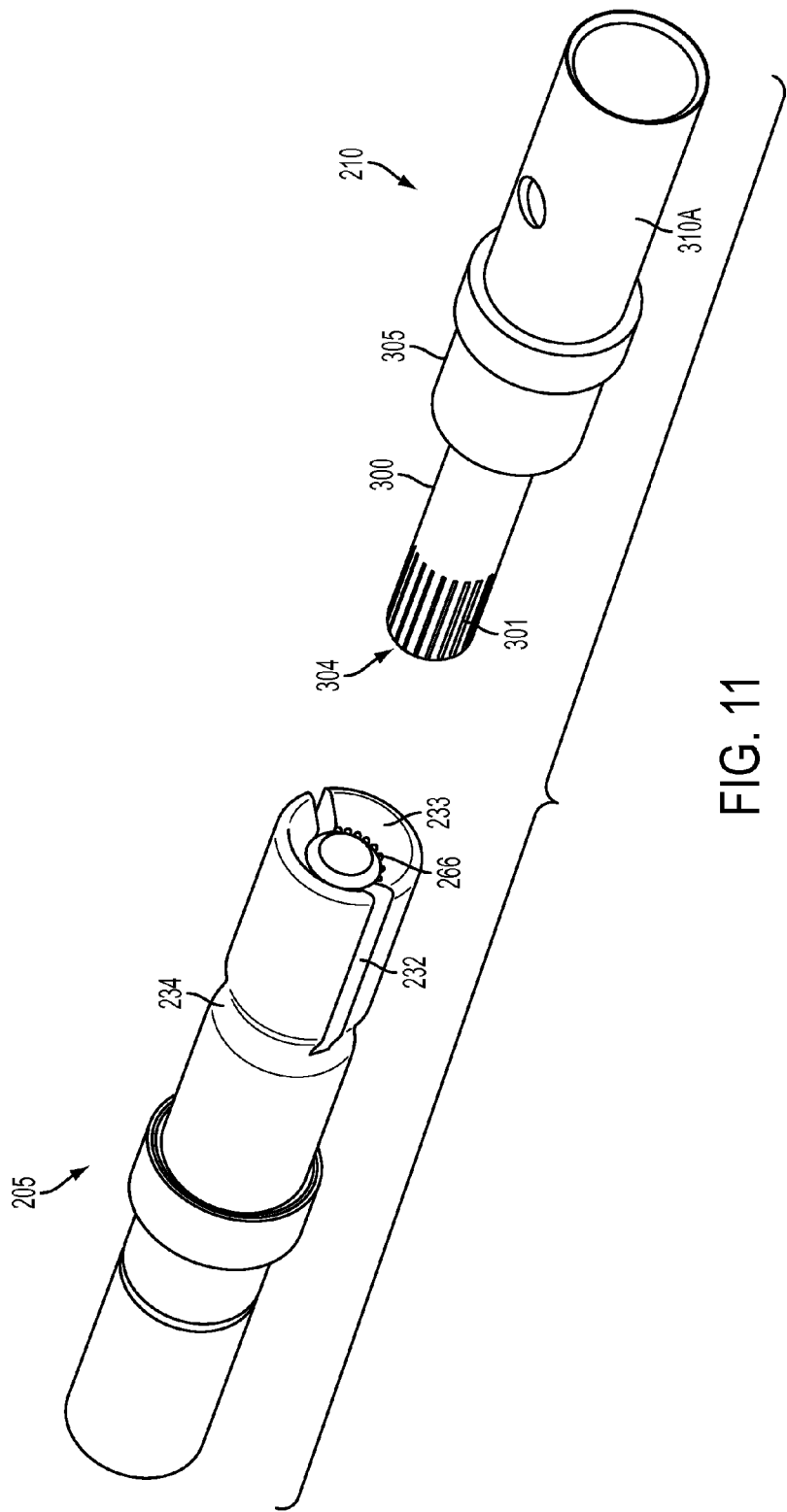
FIG. 11 illustrates an orthogonal view of another fiber optic socket contact and fiber optic pin contact system.

Another fiber optic socket contact 205 and fiber optic pin contact 210 arrangement is illustrated in FIG. 11. The fiber optic socket contact 205 is preferably an assembly of a socket contact body 215 (FIG. 12) with an alignment sleeve assembly 220. Preferably, the socket contact body 215 and the alignment sleeve assembly 220, when assembled together to form fiber optic socket contact 205, are configured and dimensioned to fit into contact cavities configured to receive and hold electrical socket contacts, such as described above. Fiber optic pin contact 210 is also preferably configured and dimensioned to fit into contact cavities sized and configured to receive and hold electrical pin contacts, such as described above.

Preferably, fiber optic socket contacts 205 and fiber optic pin contacts 210 are configured and dimensioned to be inserted and removed from contact cavities (not illustrated) using tools developed for inserting and removing electrical socket and pin contacts, such as described above. In other embodiments, a fiber optic socket contact, such as fiber optic socket contact 205, and a fiber optic pin contact, such as fiber optic pin contact 210, may be configured or dimensioned to fit into contact cavities in a connector where the contact cavities are not configured or dimensioned to receive and hold standard electrical socket or pin contacts.

Figure 13:
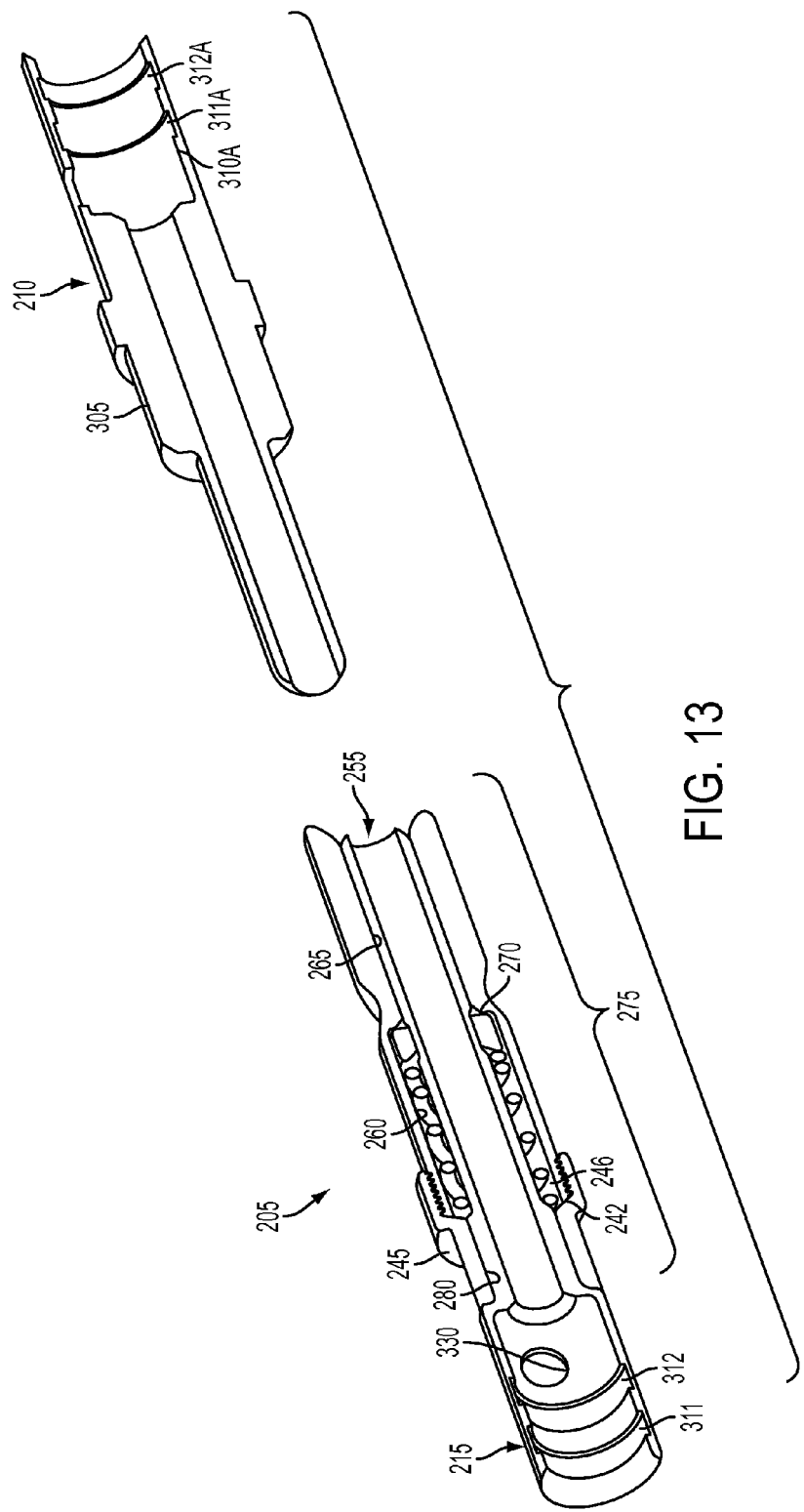
FIG. 13 illustrates an orthogonal sectional view of the fiber optic socket contact and fiber optic pin contact system of FIG. 11

An exemplary socket contact 205 is now described in further detail. The alignment sleeve assembly 220 preferably includes an alignment sleeve 230, a retention clip 235 contained in the alignment sleeve 230, a spring 240 also contained in the alignment sleeve 230, and a cap 245 affixed to a first end 250 of the alignment sleeve 230. As illustrated in FIG. 13, alignment sleeve 230 preferably includes an alignment bore 255 that has a larger diameter section 260 and a smaller diameter section 265, similar to alignment sleeve 30 described above. Unlike alignment sleeve 30 described above, smaller diameter section 265 bears a portion of an anti-rotation feature, such as a spline 266 (FIG. 11), the purpose of which is described below.

A shoulder 270 is preferably formed where the larger diameter section 260 and smaller diameter section 265 meet. Retention clip 235 preferably contacts shoulder 270 and contacts spring 240 when cap 245 is affixed to the alignment sleeve 230. Optionally, a retention clip, such as retention clip 35 described above, may have a chamfer on one surface to facilitate inserting socket ferrule 95 therethrough, or a retention clip, such as retention clip 235 may have a uniform front and back surface profile to facilitate assembling a capped sleeve by eliminating the concern regarding which edge of the retention clip 235 abuts a shoulder in an alignment sleeve, such as shoulder 270. Preferably, spring 240 is at least partially compressed when cap 245 is affixed to the first end 250 of alignment sleeve 230 to form a capped sleeve. Cap 245 may be affixed in any suitable manner, including, but not limited to, a threaded engagement, a snap connection, a bayonet or other suitable quick connection configuration, a press fit, an interference fit, or epoxy, glue or other suitable adhesive.

Figure 12:
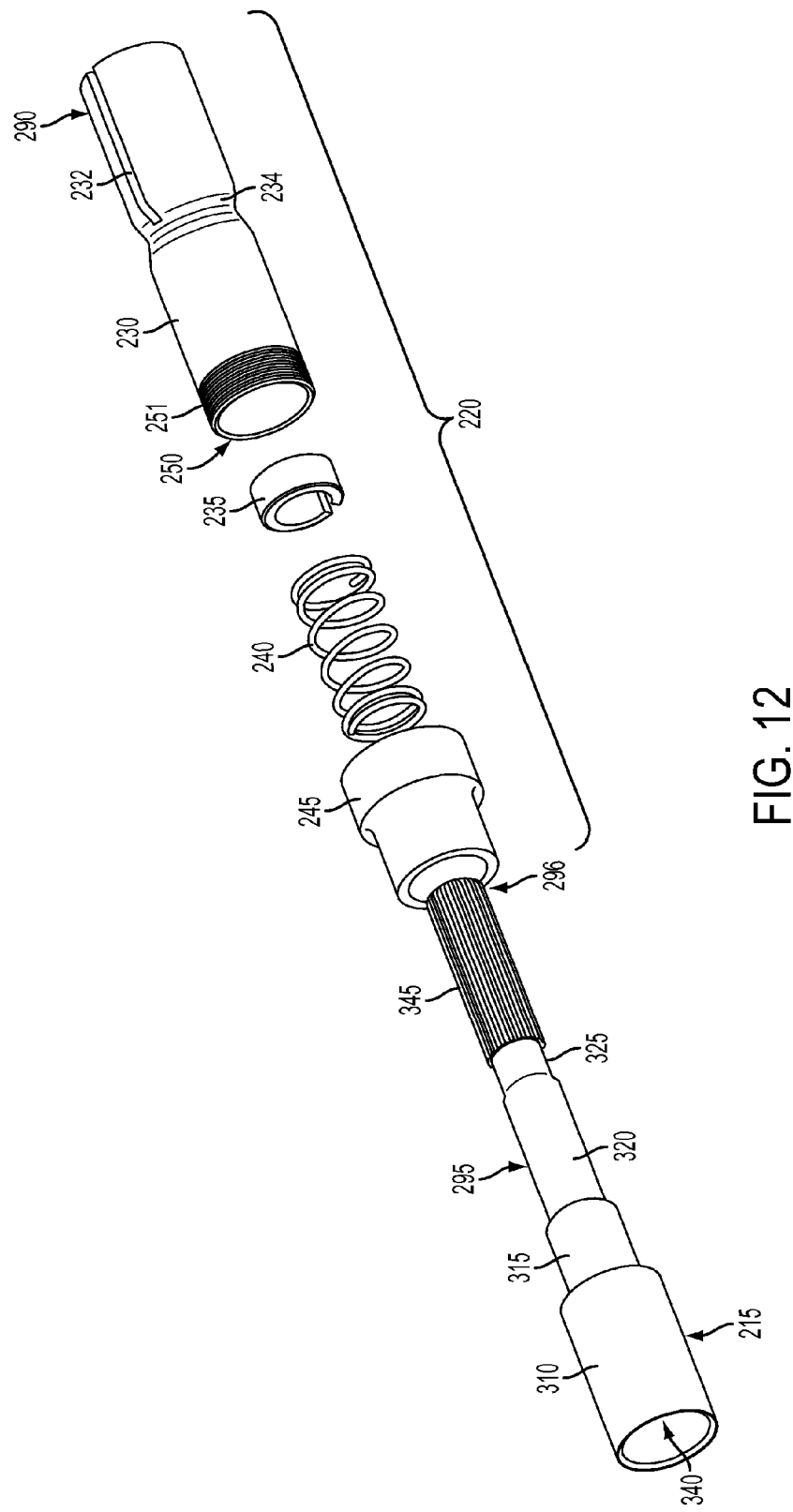
FIG. 12 illustrates an orthogonal assembly view of the fiber optic socket contact of FIG. 11.

FIGS. 12 and 13 illustrate a threaded engagement where the first end 250 of the alignment sleeve 230 includes threads 251. A complimentary thread 246 (FIG. 13) in cap 245 engages threads 251 when cap 245 and alignment sleeve 230 are engaged with a rotating motion. Preferably, when cap 245 is installed on first end 250, first end 250 abuts a shoulder 247 in cap 245. Optionally, a thread locking material may be placed on threads 251 and 246 prior to engagement.

Capped sleeve 275 (FIG. 13) preferably includes a through bore made from a cap bore 280 extending through cap 245 and the alignment bore 255. As described below, the combination of cap 245, spring 240, and retention clip 235 urge socket contact body 215 towards second end 290 of alignment sleeve 230 when socket contact body 215 is inserted in capped sleeve 275. As also described below, the smaller diameter section 265 of alignment bore 255 aligns a terminal end 296 of socket contact body 215 with a terminal end 304 of pin contact body 305 when two connector portions terminating fiber optic cables are connected together and socket ferrule 295 and pin ferrule 300 are in the smaller diameter section 265 of alignment bore 255.

Referring to FIG. 12, an exemplary socket contact body 215 includes a grip portion 310, a cap seat section 315, and a socket ferrule 295 that includes a spring engaging section 320, a groove 325 (which is preferably a snap fit feature that engages a mating snap fit feature on retention clip 235), and an anti-rotation feature, such as spline 345. Preferably, the grip portion 310, cap seat section 315, and socket ferrule 295 are a unitary construction formed from a single piece of material. For example, such as described above with respect to socket contact body 15. Preferably, groove 325 does not penetrate through a wall of socket ferrule 295 at any location of groove 325. An optional visual inspection aperture 330 may also be included through a wall of the grip portion 310. The function of the various features of the exemplary socket contact body 215 are described below with respect to assembling fiber optic socket contact 205.

Figure 14:
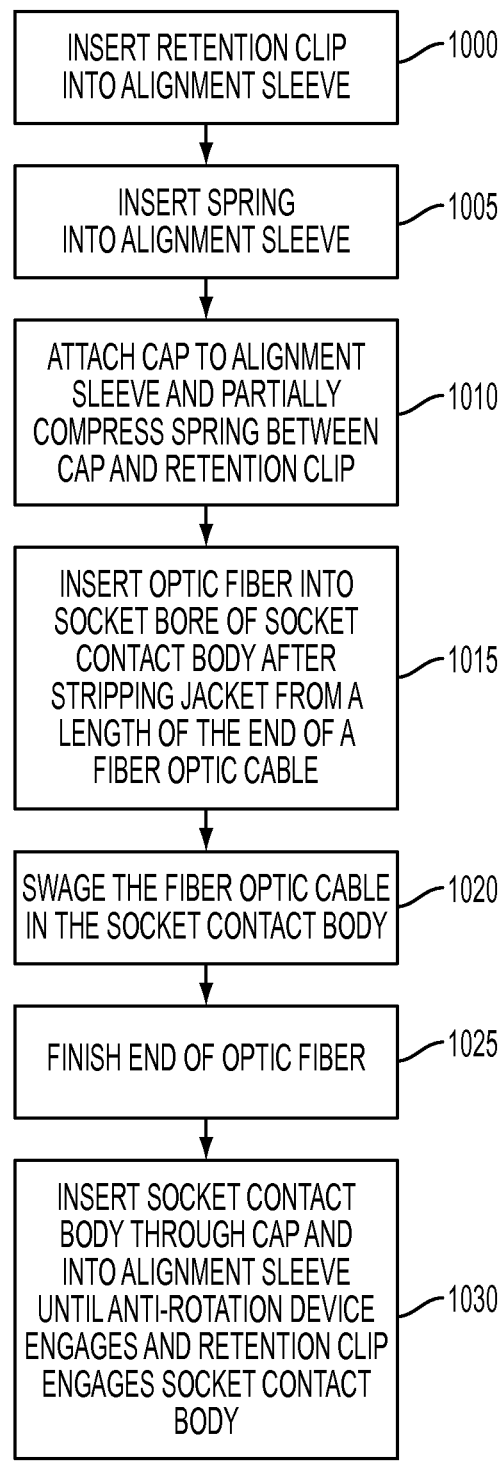
FIG. 14 illustrates a flow chart for another method for assembling a fiber optic socket contact.

A flowchart for a method for assembling a fiber optic socket contact 205 is illustrated in FIG. 14. At step 1000 retention clip 235 is slid into the larger diameter section 260 of alignment bore 255, preferably until the retention clip 235 rests against shoulder 270. Spring 240 is slid into the larger diameter section 260 of alignment bore 255 at step 1005, preferably until spring 240 touches retention clip 235. At step 1010, cap 245 is attached to the first end 250 of alignment sleeve 230.

When cap 245 is affixed to alignment sleeve 230 at step 1010 to form capped sleeve 275, spring 240 is preferably compressed, at least partially, so that spring 240 holds the retention clip 235 against shoulder 270, for example, as described above with respect to spring 40, retention clip 35 and shoulder 70. Spring 240 is preferably a linear coil spring such as described above.

At step 1015, a fiber optic cable including a single fiber 135 (FIG. 3A) is inserted into socket bore 340, which extends through socket contact body 215. Preferably, socket bore 340 is approximately 0.002 to approximately 0.005 of an inch larger than the outer diameter of fiber 135 (which typically includes a core material surrounded by a cladding layer). A jacket 137 and fiber buffer 136 are removed, or stripped, from an end portion of fiber 135, and fiber 135 is passed through the socket bore 340.

Preferably a small portion of the fiber buffer 136 is exposed as illustrated in FIG. 3A to assist wedging fiber 135 in place in socket bore 340, for example, as described above. A visual inspection aperture 330 preferably allows the assembler to visually confirm that a section of fiber 135 surrounded by jacket 137 is located in the grip portion 310 of the socket contact body 215. Placing a section of fiber 135 surrounded by fiber buffer 136 and jacket 137 in the grip portion 310 preferably permits use of a swaging tool at step 1020 to collapse portions of the walls of grip portion 310 onto the fiber optic cable without altering, or significantly altering, the light propagation characteristics of fiber 135. Swaging grip portion 310 preferably forces portions of jacket 137, fiber buffer 136, or both into grooves 311 and 312 (FIG. 13) to facilitate holding the fiber 135 securely in place.

In some embodiments, for example, when a fiber optic cable includes multiple fibers, a jacketed portion of such a fiber optic cable may not be inserted into the grip portion 310, but a portion including a fiber buffer and fiber may be inserted into the grip portion 310. In other embodiments, a standard electrical contact crimping tool, such as described above, may be used to secure fiber 135 in place in grip portion 310. Thus, swaging (that is, squeezing to essentially reduce the diameter) or crimping (that is, pinching to cause deformations at one or several points) or otherwise suitably deforming the socket contact body 215 onto the optical fiber 135 preferably secures optical fiber 135 in socket contact body 215 without using an adhesive and without interfering, or substantially interfering, with light signal propagation through the fiber 135.

At step 1025, an end of fiber 135 protruding out of socket bore 340 past the terminal end 296 of socket ferrule 295 is trimmed, polished, or otherwise finished as is known in the art. Preferably, fiber 135 protrudes slightly past the terminal end 296 of socket ferrule 295 when finished.

Socket contact body 215 is inserted in capped sleeve 275 at step 1030 by pushing socket ferrule 295 through the cap bore 280, the larger diameter portion 260 of alignment bore 255 and spring 240, and into the smaller diameter portion 265 of alignment bore 255. Inserting socket contact body 215 into capped sleeve 275 includes engaging spline 345 of socket ferrule 295 with spline 266 of the smaller diameter portion 265 to inhibit relative rotation between socket ferrule 295 and capped sleeve 275. Inserting socket contact body 215 into capped sleeve 275 also includes engaging retention clip 235 with socket ferrule 295, for example, by snapping into groove 325 such that a portion of the inside surface of the retention clip 235 acts as a snap fit feature to engage the socket ferrule 295 in a manner that transfers the force from spring 240 to the socket contact body 215 which also limits the movement of socket contact body 215 toward the second end 290 of alignment sleeve 230. Retention clip 235 may, or may not, include a flat, such as flat 36 described above with respect to retention clip 35. Alternatively, a retention clip, such as retention clip 235, may engage socket ferrule 295 in other suitable manners, for example, as described above.

An assembled fiber optic socket contact 205 containing an optical fiber 135 is preferably inserted into a connector housing standard tools for inserting electric socket contacts, such as tools used to insert 16 gauge electric sockets meeting one or more standards designated under a BACC47FK(#)(#) specification (FIG. 2B). A second optical fiber 135 is inserted and swaged into a fiber optic pin contact body 305, for example, with a grip section 310A substantially as described above with respect to socket contact body 215. A fiber optic pin contact 210 is preferably inserted into a second connector housing standard tools for inserting electric pin contacts, such as tools used to insert 16 gauge electric pins meeting one or more standards designated under a BACC47FKJ(#)(#) specification (FIG. 2B).

With reference to FIG. 11, when the first and second connector housings are brought together, a pin ferrule 300 of fiber optic pin contact 210 enters the smaller diameter portion 265 of alignment bore 255. For clarity, connectors 26, 28 are not illustrated in FIG. 11, but socket contact 205 and pin contact 210 would typically be retained in connectors, such as connectors 26, 28, when joined together. Preferably, a radiused entrance 233 helps guide pin ferrule 300 into alignment bore 255. Alignment bore 255 is preferably dimensioned to receive both socket ferrule 295 and pin ferrule 300 with a press fit and to align them so that the terminal ends of the fibers 135 held by the socket contact body 215 terminal end 296 and the pin contact body 305 terminal end 304 are pressed together. Spline 266 in alignment bore 255 engages spline 301 on pin contact body 305 to inhibit relative rotation between capped sleeve 275 and pin contact 210. While a spline is described as a preferred anti-rotation device, other suitable devices such as a fin and a mating groove may be used.

Preferably, when the two connector housings are brought together, pin ferrule 300 enters far enough into the smaller diameter portion 265 of alignment bore 255 to push socket contact body 215 away from the second end 290 of the alignment sleeve 230. Spring 240, acting though the engagement of retention clip 235 to socket ferrule 295, urges the socket contact body 215 toward the second end 290 of the alignment sleeve 230 to apply sufficient pressure to keep the finished, terminal ends of the optical fibers 135 held by the socket contact body 215 and the pin contact body 305 pressed together, regardless of vibrations or other conditions encountered during use of the connector. The amount of displacement of spring 240 and the force exerted by spring 240 when pin ferrule 300 enters alignment bore 255 are design parameters that can be modified depending on the expected operational environment for a connector to provide sufficient force to keep the finished ends of the fibers 135 held by the socket contact body 215 and the pin contact body 305 pressed together. An anti-rotation device, such as the engagement of spline 266 with splines 345 and 301, inhibits rotation of socket contact 205 with respect to pin contact 210 which inhibits the abutting optic faces of the two fibers 135 from scratching each other.

Preferably, alignment sleeve 230 includes one or more slots 232 through a sidewall of alignment sleeve 230 and proximate the second end 290, similar to slots 32 described above. Slots 232 preferably allow alignment sleeve 230 to expand when pin ferrule 300 is inserted into alignment bore 255. Slots 232 also, preferably in combination with groove 234 which reduces the spring stiffness of the second end 290 of the alignment sleeve 230, provide a spring force that urges portions of the second end 290 together when a pin ferrule 300 is inserted to apply a compression force to pin ferrule 300 to help hold pin ferrule 300 in place in alignment bore 255. In a preferred embodiment, two slots 232 approximately 0.015 of an inch wide and approximately 0.200 of an inch long are provided. Groove 234 is preferably approximately 0.008 of an inch deep to approximately 0.012 of an inch deep. Each slot 232 preferably extends along alignment sleeve 230 for approximately the distance of the smaller diameter portion 265 of the alignment bore 255. Preferably slots 232 and groove 234 facilitate creating a press fit between the alignment sleeve 230 and the pin ferrule portion 300. Including groove 234 preferably provides sufficient flexibility for the second end 290 of alignment sleeve 230 to automatically align pin ferrule 300 with alignment bore 255 in the event there is initial misalignment between the pin ferrule 300 and the alignment bore 255.

Optionally, socket contact body 215 includes a cap seat section 315 that remains in constant contact with the inner wall of cap bore 280 throughout the compression range of spring 240. Preferably no part of socket contact body 215 becomes caught on cap 245 in a manner that prevents retention clip 235 from returning to contact shoulder 270 even if socket contact body 215 is moved away from the second end 290 of alignment sleeve 230 to the full extent of movement permitted by spring 240.

In an exemplary embodiment, socket contact body 215, cap 245, retention clip 235, alignment sleeve 230, and pin contact body 305 are machined from 304 stainless steel. Other suitable materials may be used, such as T6-7075 aluminum alloy or other suitable metal, polytetrafluoroethylene, nylon, or other suitable polymer.

It will be obvious to those having skill in the art that many changes may be made to the details of the above-described embodiments without departing from the underlying principles of the invention. While certain preferred systems and methods have been shown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A socket contact for an optical fiber comprising:
   an alignment sleeve including a first end, a second end, a longitudinal axis extending between the first and second ends, and an alignment bore extending through the alignment sleeve coaxially aligned with the longitudinal axis, wherein the alignment bore includes a larger diameter portion, a smaller diameter portion, and a shoulder formed at an intersection of the larger diameter portion and the smaller diameter portion;
   a cap affixed to the first end of the alignment sleeve to form a capped sleeve, wherein the cap includes a cap bore extending through the cap and the cap bore and the alignment bore cooperate to form a capped sleeve bore that is coaxial with the longitudinal axis;
   a socket contact body slidably received in the capped sleeve, wherein the socket contact body includes (a) a grip section configured for deforming onto a portion of a fiber optic cable, (b) a ferrule section substantially located in the capped sleeve bore, (c) a fiber bore extending through the socket contact body and coaxially aligned with the longitudinal axis of the alignment sleeve; and (d) a fiber optic terminal end located distally from the grip section;
   a retention clip engaging the ferrule section of the socket contact body and located in the larger diameter section of the alignment bore of the alignment sleeve proximate the shoulder; and
   a spring located in the larger diameter section of the alignment bore, wherein the spring is at least partially compressed between the cap and the retention clip to transfer force from the spring to the socket contact body to urge the socket contact body toward the second end of the alignment sleeve.

2. A socket contact for an optical fiber according to claim 1, wherein:
   the larger diameter portion of the alignment bore includes an inner wall;
   the smaller diameter portion of the alignment bore includes an inner wall; and
   at least a portion of the ferrule section contacts the inner wall of the smaller diameter portion of the alignment sleeve.

3. A socket contact for an optical fiber according to claim 2, wherein the smaller diameter portion of the alignment bore bears a first alignment feature and the ferrule section of the socket contact body bears a second alignment feature that engages the first alignment feature to inhibit rotation between the alignment sleeve and the socket contact body about the longitudinal axis.

4. A socket contact for an optical fiber according to claim 3, wherein the first alignment feature includes a spline internal to the smaller diameter portion of the alignment bore and the second alignment feature includes a spline on the ferrule section of the socket contact body.

5. A socket contact for an optical fiber according to claim 1, wherein:
   the (a) grip section configured for deforming onto an optical fiber, (b) ferrule section, and (c) fiber optic terminal end of the socket contact body are formed from one continuous piece of material.

6. A socket contact for an optical fiber according to claim 1, wherein a portion of the ferrule section is located in the smaller diameter portion of the alignment bore.

7. A socket contact for an optical fiber according to claim 1, wherein the grip section of the socket contact body is completely outside the capped sleeve bore.

8. A socket contact according to claim 1, further comprising at least one slot formed through a sidewall of the alignment sleeve, wherein the at least one slot extends from the second end toward the first end substantially the length of the smaller diameter portion of the alignment bore.

9. A socket contact for an optical fiber according to claim 8, further comprising a spring stiffness adjusting groove encircling the alignment sleeve proximate the end of the at least one slot that is closest to the first end of the alignment sleeve.

10. A socket contact for an optical fiber according to claim 1, wherein:
    the retention clip includes a first snap fit feature;
    the socket contact body includes a second snap fit feature; and
    the first snap fit feature of the retention clip engages the second snap fit feature of the socket contact body to retain the ferrule section of the socket contact body substantially in the capped sleeve bore.

11. A socket contact for an optical fiber according to claim 10, wherein:
    the first snap fit feature includes the retention clip forming a snap ring; and
    the second snap fit feature includes an annular groove formed in the external surface of the ferrule section.

12. A socket contact for an optical fiber according to claim 11, wherein the ferrule section is substantially cylindrical and a portion of the ferrule section passes through the retention clip.

13. A socket contact according to claim 10, further comprising an opposing pair of slots formed through a sidewall of the alignment sleeve, wherein each slot extends from the second end toward the first end substantially the length of the smaller diameter section of the alignment bore.

14. A method for assembling a fiber optic socket contact comprising:
    inserting a retention clip into an alignment sleeve bore in an alignment sleeve to abut a shoulder in the alignment sleeve bore;
    inserting a spring into the alignment sleeve bore;
    securing a cap onto the alignment sleeve to at least partially compress the spring between the cap and the retention clip and form a capped sleeve;
    inserting a fiber optic cable having an optical fiber into a socket contact body to place a portion of the fiber optic cable in a gripping portion of the socket contact body and a stripped portion of the fiber optic cable in a ferrule portion of the socket contact body;
    deforming the gripping portion of the socket contact body to retain the fiber optic cable in place in the socket contact body; and
    inserting the socket contact body ferrule into the capped sleeve until a first snap fit feature on the socket contact body engages the retention clip to retain the socket contact body ferrule in the capped sleeve.

15. A method for assembling a fiber optic socket contact according to claim 14, wherein inserting the socket contact body into the capped sleeve further comprises engaging an anti-rotation feature on the socket contact body with an anti-rotation feature on the alignment sleeve to inhibit rotational motion between the socket contact body and the alignment sleeve about a common longitudinal axis.

16. A method for assembling a fiber optic socket contact according to claim 15 wherein engaging an anti-rotation feature on the socket contact body with an anti-rotation feature on the alignment sleeve further comprises mating a first spline on the socket contact body ferrule with a second spline in the alignment sleeve bore.

17. A socket and pin contact system for an optical fiber comprising:
- an alignment sleeve including a first end, a second end, a longitudinal axis extending between the first and second ends, and an alignment bore coaxially aligned with the longitudinal axis extending through the alignment sleeve, wherein the alignment bore includes a larger diameter portion, a smaller diameter portion, and a shoulder formed at an intersection of the larger diameter portion and the smaller diameter portion;
- a cap affixed to the first end of the alignment sleeve to form a capped sleeve, wherein the cap includes a cap bore extending through the cap and the cap bore cooperates with the alignment bore to form a capped sleeve bore that is coaxially aligned with the longitudinal axis;
- a socket contact body slidably received in the alignment sleeve, wherein the socket contact body includes (a) a grip section configured for deforming onto a fiber optic cable, (b) a ferrule section substantially located in the caped sleeve bore, (c) a fiber bore extending through the socket contact body and coaxially aligned with the longitudinal axis of the alignment sleeve, and (d) a fiber optic terminal end distal from the grip section;
- a retention clip engaging the ferrule section of the socket contact body and located in the larger diameter section of the alignment bore of the alignment sleeve proximate the shoulder;
- a spring located in the larger diameter section of the alignment bore, wherein the spring is at least partially compressed between the cap and the retention clip to transfer force from the spring to the socket contact body to urge the socket contact body toward the second end of the alignment sleeve; and
- a pin contact body including (a) a grip section configured for deforming onto an optical fiber, (b) a ferrule section, (c) a fiber bore extending through the socket contact body, and (d) a fiber optic terminal end distal from the grip section;
- wherein the smaller diameter portion of the alignment bore is dimensioned to receive and align the socket contact body terminal end with the pin contact body terminal end when the socket contact body ferrule section and the pin contact body ferrule section are retained by the smaller diameter section of the alignment bore.

18. A socket and pin contact system according to claim 17 further comprising:
- a first anti-rotation feature on the socket contact body;
- a second anti-rotation feature on the alignment sleeve; and
- a third anti-rotation feature on the pin contact body;
- wherein the first and second anti-rotation features engage each other and the second and third anti-rotation features engage each other when the pin contact body is inserted into the alignment sleeve, to thereby inhibit rotational movement about the longitudinal axis of the socket contact body with respect to the pin contact body.

19. A socket and pin contact system according to claim 18 wherein:
- the first anti-rotation feature includes a first spline on the socket contact body ferrule;
- the second anti-rotation feature includes a second spline in the smaller diameter portion of the alignment bore extending through the alignment sleeve; and
- the third anti-rotational feature includes a third spline in the pin contact body ferrule portion.

* * * * *

UNITED STATES PATENT AND TRADEMARK OFFICE
CERTIFICATE OF CORRECTION

PATENT NO. : 8,491,199 B1
APPLICATION NO. : 13/187376
DATED : July 23, 2013
INVENTOR(S) : Phong Dang Page 1 of 1

It is certified that error appears in the above-identified patent and that said Letters Patent is hereby corrected as shown below:

In the Specification

In column 7, line 48, after "housing", insert --using--.

In column 7, line 56, after "housing", insert --using--.

In column 9, line 36, after "235", insert --,--.

In column 11, line 32, after "housing", insert --using--.

In column 11, line 40, after "housing", insert --using--.

In the Claims

In column 15, line 20, replace "caped" with --capped--.

Signed and Sealed this
Fourteenth Day of April, 2015

Michelle K. Lee
*Director of the United States Patent and Trademark Office*